United States Patent

[11] 3,601,423

| [72] | Inventor | Cecil Goodacre<br>Basingstoke, England |
|---|---|---|
| [21] | Appl. No. | 836,482 |
| [22] | Filed | June 25, 1969 |
| [45] | Patented | Aug. 24, 1971 |
| [73] | Assignee | Lansing Begnall Limited<br>Basingstoke, England |
| [32] | Priority | June 27, 1968 |
| [33] | | Great Britain |
| [31] | | 30,779/68 |

[54] INDUSTRIAL PALLET AND STILLAGE TRUCKS
8 Claims, 3 Drawing Figs.

| [52] | U.S. Cl. | 280/43.12 |
|---|---|---|
| [51] | Int. Cl. | B66f 9/06 |
| [50] | Field of Search | 280/43.24, 43.12 |

[56] References Cited
UNITED STATES PATENTS

| 2,608,315 | 8/1952 | Turner | 214/731 |
|---|---|---|---|
| 2,940,767 | 6/1960 | Quayle | 280/43.12 |
| 3,202,233 | 8/1965 | Dolphin et al. | 280/43.12 X |
| 3,246,713 | 4/1966 | Nichols | 280/43.12 X |
| 3,290,051 | 12/1966 | O'Brien | 280/43.12 |

Primary Examiner—Benjamin Hersh
Assistant Examiner—John P. Silverstrim
Attorney—E. T. Le Gates ABSTRACT: An industrial pallet truck comprises a body portion, a load-carrying portion mounted for up-and-down movement relatively to the body portion, two hydraulic rams for raising a root portion of the load-carrying portion, and a linkage operable by movement of the root portion relatively to the body portion and including ground engaging members for raising and lowering the end of the load-carrying portion remote from the root portion, in unison with the root portion. Each ram comprises a cylinder connected to the body portion and a plunger connected to the load-carrying portion and the linkage comprises two operative levers each pivotally connected at its fulcrum to said root portion, each lever also being pivotally connected directly to the lower end of the cylinder of one of the rams, so that up-and-down movement of the root portion imparts pivoting movement to the lever to operate said linkage. The truck has fork arms which may be attached to the load-carrying portion in alternative positions.

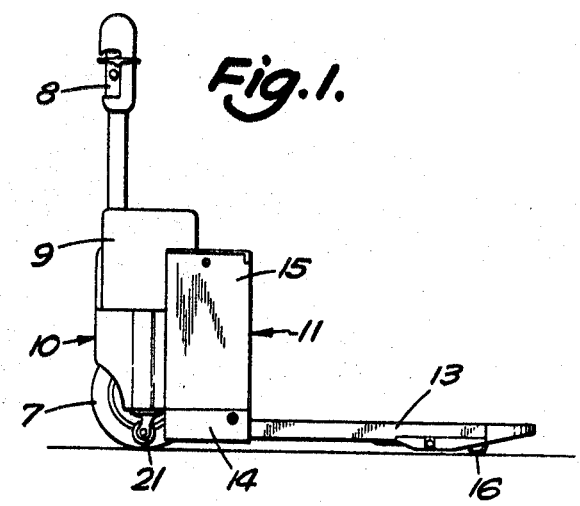
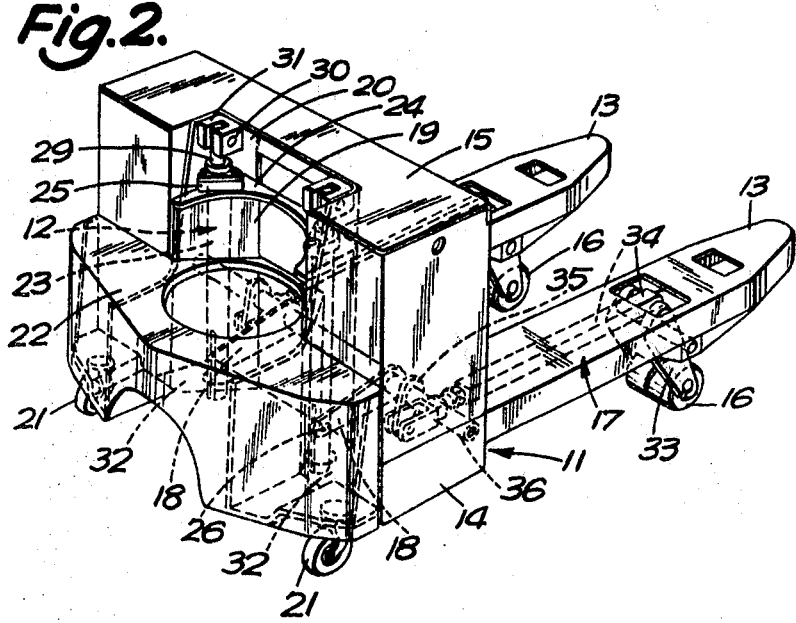

INDUSTRIAL PALLET AND STILLAGE TRUCKS

The invention relates to industrial pallet and stillage trucks of the kind comprising a body portion, a load-carrying portion mounted for generally up-and-down movement relatively to the body portion, at least one hydraulic ram for raising a root portion of the load-carrying portion and a linkage operable by movement of the root portion relatively to the body portion and including ground engaging members for raising and lowering the end of the load-carrying portion remote from the root portion, in unison with the root portion.

According to the invention a truck of the above kind is characterized in that there are provided two rams each comprising a stationary part connected to the body portion and a moving part connected to the load-carrying portion and in that the linkage comprises two operative levers each pivotally connected at its fulcrum to said root portion, each lever also being pivotally connected directly to the lower end of the stationary part of one of the rams, whereby generally up-and-down movement of the root portion imparts pivoting movement to the levers to operate said linkage.

Preferably the stationary part of each ram is connected to the body portion by a readily detachable rigid connection, and the moving part of each ram is connected to the load-carrying portion by a readily detachable pivotal connection.

The cylinder of each ram may constitute the stationary part thereof, and the plunger of the ram may constitute the moving part thereof.

The upper end of each ram cylinder may be bolted to a part of the body portion and the lower end of the ram cylinder fits in a socket in a part of the body portion.

A part of each said operative lever may conveniently be received within an axial slot in a part of its associated ram cylinder, being retained in the slot by a pivotal connection. Preferably the two operative levers are secured to a common shaft.

In any of the above arrangements the load-carrying portion may comprise two spaced horizontal fork arms and means may be provided for attaching the ends of the fork arms to the root portion of the load-carrying portion in a plurality of alternative positions. For example, each fork arm may be formed with a plurality of holes adapted to be registrable with any one of a number of sets of holes in the root portion whereby the fork arms may be bolted to the root portion in a plurality of alternative positions by bolts passing through the registering holes.

By way of example, a specific embodiment in accordance with the invention will now be described with reference to the accompanying diagrammatic drawings in which:

FIG. 1 is a side elevation of an industrial pallet truck;

FIG. 2 is a perspective view of part of the truck shown in FIG. 1; and

Figure 3:
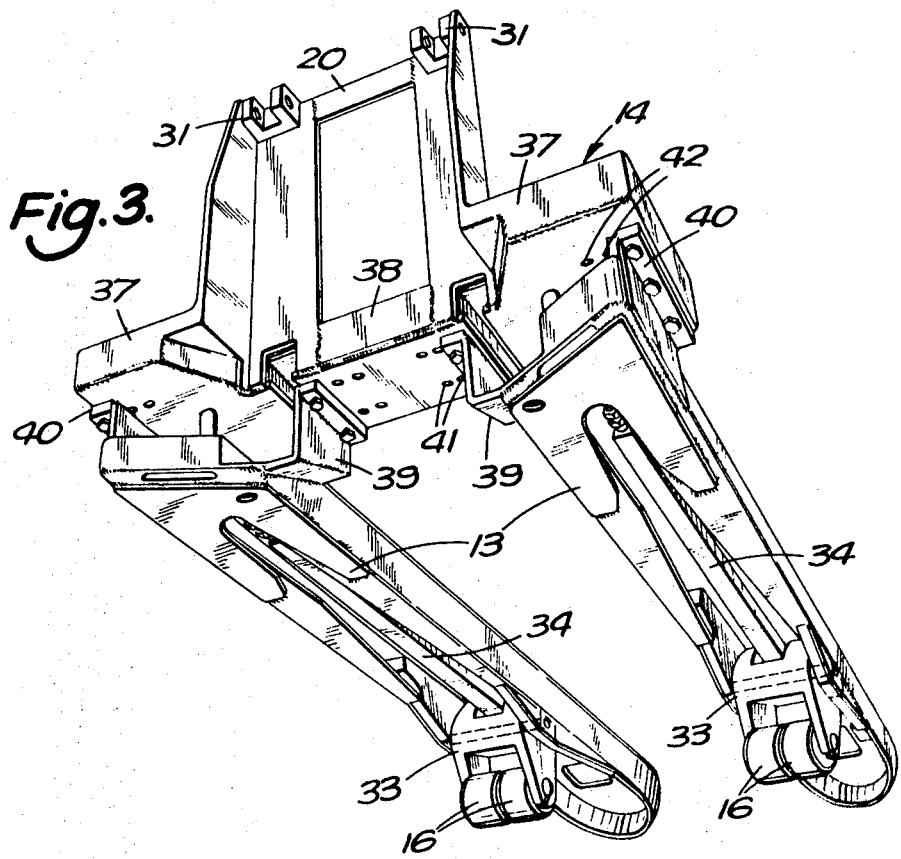
FIG. 3 is a perspective view, from below, of a part of the truck.

With reference to FIGS. 1 and 2, the industrial pallet truck comprises a body portion 10 and a load-carrying portion 11 which is movable relatively to the body portion in a substantially vertical direction by a pair of hydraulic rams 12. This load-carrying portion 11 comprises a pair of forks 13 joined together by a transverse root portion 14 which comprises a platform for the truck's storage battery. In this example, the battery is provided in two parts housed in a container 15. The ends of the forks 13 which are remote from the root portion 14 are supported on trail wheels 16 which are connected to each other and to the root portion 14 by a known form of linkage 17, described below, whereby the ends of the forks supported by the trail wheels 16 are raised and lowered together with the root portion.

As will be seen from FIG. 2, the body portion 10 comprises an upright U-shaped frame 19 which is nested within a U-shaped upright frame 20 on the load-carrying portion 11. Castor wheels 21 are mounted at the lower end of the frame 19 of the body portion.

The body portion 10 is provided with a further support frame 22 which projects horizontally away therefrom. Mounted on the frame 22 is the electrical control gear, the hydraulic pump and motor of the truck (disposed within a casing indicated at 9 in FIG. 1). The control gear is operated, in known manner, from a control arm 8. Also mounted below the frame 22 is a ground wheel 7 which is driven by an electric motor mounted in the hub of the wheel and is steerable by the control arm 8.

The above-mentioned rams 12 are mounted vertically between the frame 19 of the body portion 10 and the frame 20 of the load-carrying portion 11. The rams 12 comprise cylinders 23 having their upper ends attached to the upper surface 24 of the frame 19 by triangular brackets 25 bolted thereto. The lower ends of the cylinders 23 are forked and are pivotally connected to levers 18 of the linkage 17 by pivot pins 26. The portions of the forked ends of the cylinders 23 projecting below the pivot pins 26 pass through holes in laterally projecting horizontal parts 32 at the lower end of the frame 19. Movement of the lower ends of the cylinders 23, in a direction longitudinally of the truck, is thereby precluded. The rams 12 have plungers 29 which project from the upper ends of the cylinders 23 and are pivotally connected by pivot pins 30 to brackets 31 attached to the frame 20. Hence extension of the rams 12 (whose plungers are attached to frame 20 of load-carrying portion 11 and whose cylinders are attached to upper surface 24 of frame 19 of body portion 10) will raise the frame 20 and root portion 14 of the load-carrying portion 11 with the battery containers 15 relatively to the body portion 10. Similarly, contraction of the rams 12 will draw frame 20 of load-carrying portion 11 downwardly relatively to frame 19 of body portion 10, thus lowering the root portion 14 of the load-carrying portion 11 relatively to the body portion 10.

The wheels 16 are mounted on arms 33 pivotally mounted at the ends of the fork arms 13. Pivotally connected to each arm 33, above its pivot axis, is one end of a push rod 34, the other end of which is pivotally connected to a lever arm 35 secured to a rotatable shaft 36. The shaft 36 is mounted in bearings in the root portion 14 of the load-carrying portion 11, and also secured to the shaft 36 are the aforementioned levers 18 which are connected to the lower ends of the cylinders 23. It will thus be seen that as the root portion 14 (and hence the shaft 36) is raised relatively to the body portion 10, the levers 18 will swing arcuately up and down about the pivots 26 and will cause the shaft 36 to rotate so that the arms 35 impart longitudinal movement to the push rods 34. This swings the arms 33 downwardly, lowering the wheels 16 to raise the ends of the fork arms 13. Similarly the wheels 16 are raised as the root portion 14 is lowered.

As stated above, the levers 18 of the linkage 17 are pivotally connected to lower ends of the ram cylinders 23. This feature is advantageous since the weight of the load-carrying portion and the battery is transmitted directly to the rams instead of, for example, to the body portion 10 and then to the rams.

Also, in the construction of truck described above, the body portion 10 is readily dismantled from the load-carrying portion 11. Such dismantling may be achieved by disconnecting the hydraulic connections to the rams and removing the bolts attaching the brackets 25 and the upper ends of the cylinders 23 of the rams to the upper surface 24 of the frame 19. The rams may then be lifted until the lower ends of their cylinders 23 are removed from the holes in the horizontal parts 32 of the body portion whereupon the body portion 10 is disconnected from the load-carrying portion. This procedure is advantageous since it avoids any dismantling of the linkage 17.

Alternatively, dismantling may be effected by removing the pivot pins 30 connecting the plungers 29 to the brackets 31 and removing the pivot pins 26 connecting the levers 18 to the lower ends of the ram cylinders. In this case the rams remain on the body portion of the truck and the hydraulic connections need not be disconnected.

FIG. 3 shows in greater detail the construction of the load-carrying portion of the pallet truck and also the manner in which the fork arms 13 are mounted on the load-carrying portion. As will be seen from FIG. 3 the root portion 14 comprises two horizontal platform parts 37 projecting laterally away from a central platform portion 38 at the lower end of the U-shaped upright frame 20. The root of each fork 13 underlies one of the platform parts 37 and has welded thereto angle brackets 39 and 40. The central platform part 38 is formed with a number of sets of holes 41 by means of which the brackets 39 may be bolted to that part. Similarly the platform parts 37 are formed with sets of holes 42 by means of which the brackets 40 may be bolted to those parts. It will thus be seen that by selecting the appropriate set of holes 41 and 42 the distance apart of the fork arms 13 on the load-carrying structure may be readily adjusted. It will be appreciated that to permit sideways adjustment of the fork arms 13 the arms 35 require to be slidable on the shaft 36. The arms may, for example, be splined on to the shaft.

The invention is not restricted to the specific details of the embodiment described above. For example, the invention is applicable to a stillage truck in which the forks 13 of the above described pallet truck are replaced by a load platform.

I claim:

1. An industrial truck comprising a body portion, a load-carrying portion mounted for up-and-down movement relatively to the body portion, two hydraulic rams for raising a root portion of the load-carrying portion, and a linkage operable by movement of the root portion relatively to the body portion and including ground engaging members for raising and lowering the end of the load-carrying portion remote from the root portion, in unison with the root portion each ram comprising a stationary part connected to the body portion by a readily detachable rigid connection and a moving part connected to the load-carrying portion, and the linkage comprising two operative levers each pivotally connected to said root portion, each lever also being pivotally connected directly to the lower end of the stationary part of one of the rams, so that up-and-down movement of the root portion imparts pivoting movement to the lever to operate said linkage.

2. An industrial truck according to claim 1 wherein the moving part of each ram is connected to the load-carrying portion by a readily detachable pivotal connection.

3. An industrial truck according to claim 1 wherein the cylinder of each ram constitutes the stationary part thereof, and the plunger of the ram constitutes the moving part thereof.

4. An industrial truck according to claim 1 wherein the upper end of each ram cylinder is bolted to a part of the body portion and the lower end of the ram cylinder fits in a socket in a part of the body portion.

5. An industrial truck according to claim 3 wherein a part of each said operative lever is received within an axial slot in a part of its associated ram cylinder and is retained in the slot by a pivotal connection.

6. An industrial truck according to claim 1 wherein the two operative levers are secured to a common shaft.

7. An industrial truck according to claim 1 wherein the load-carrying portion comprises two spaced horizontal fork arms and means are provided for attaching the ends of the fork arms to the root portion of the load-carrying portion in a plurality of alternative positions.

8. An industrial truck according to claim 7 wherein each fork arm is formed with a plurality of holes adapted to be registrable with any one of a number of sets of holes in the root portion whereby the fork arms may be bolted to the root portion in a plurality of alternative positions by bolts passing through the registering holes.